Oct. 4, 1932.　　　G. LANGFORD　　　1,880,349
METHOD OF REPAIRING RAIL JOINT BARS IN TRACK
Filed Aug. 14, 1930　　　7 Sheets-Sheet 1
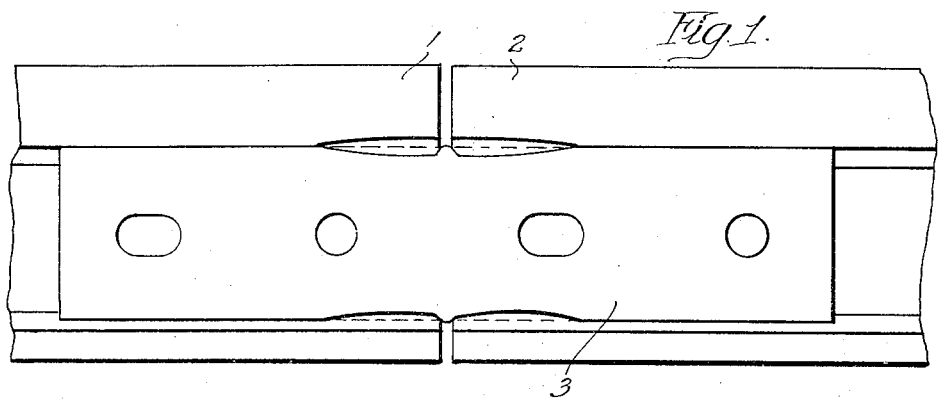
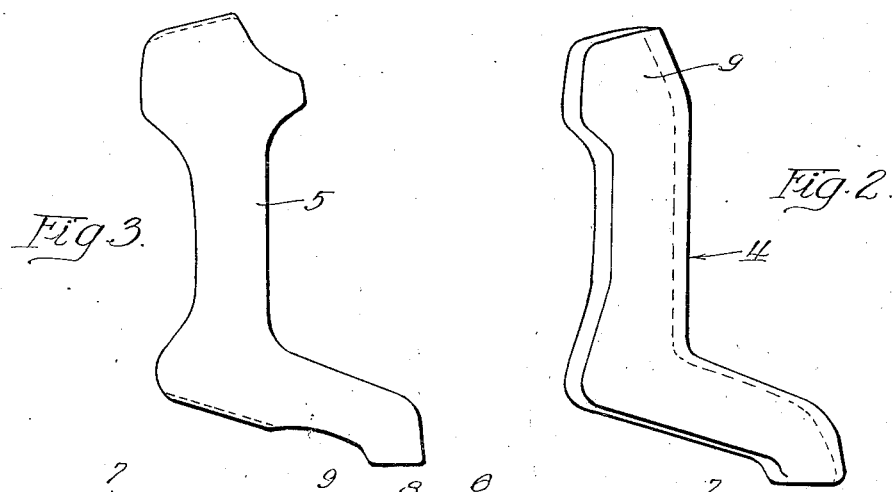
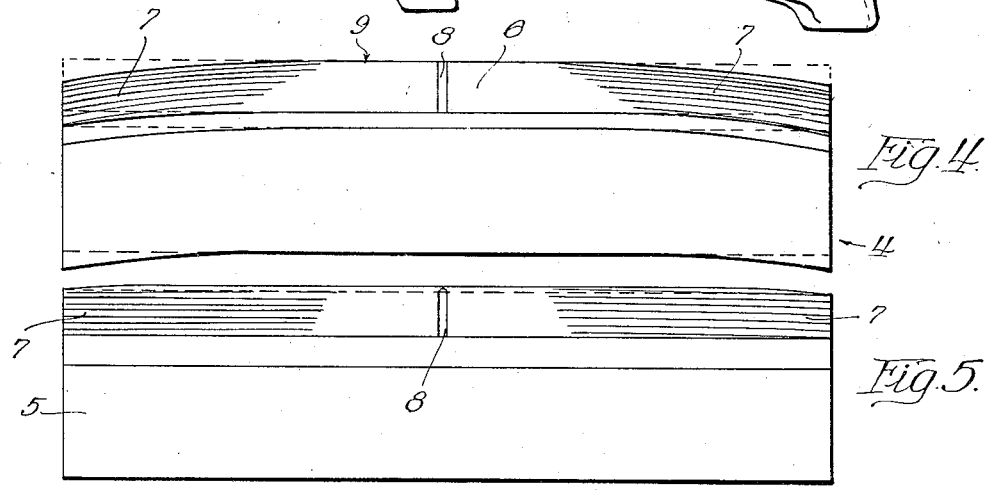
Inventor.
George Langford
By Brown, Jackson, Boettcher & Dienner
Attys Oct. 4, 1932. G. LANGFORD 1,880,349
METHOD OF REPAIRING RAIL JOINT BARS IN TRACK
Filed Aug. 14, 1930 7 Sheets-Sheet 2
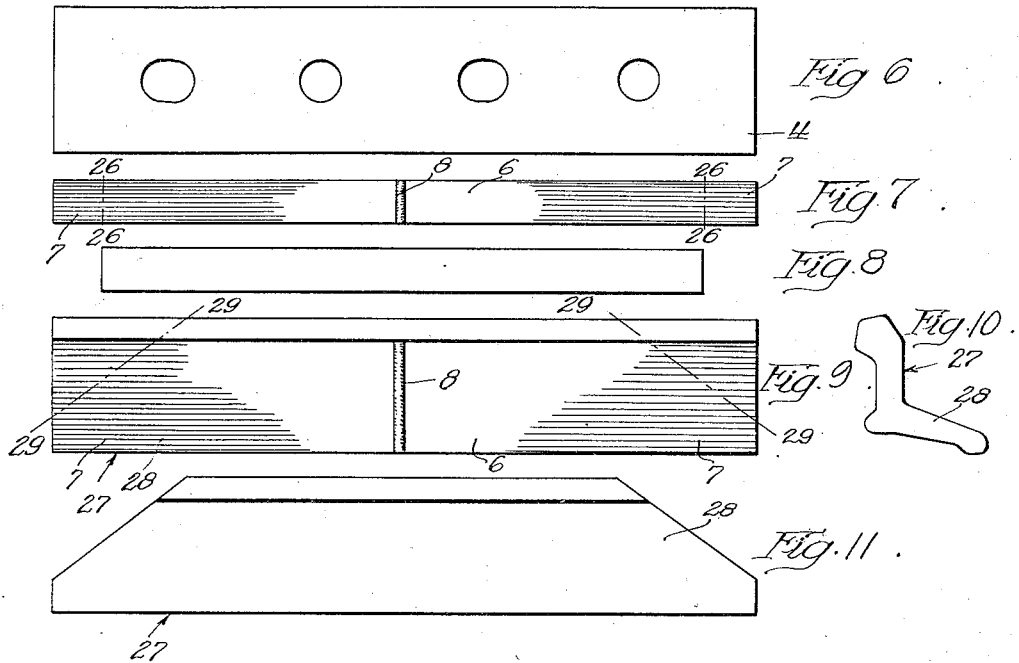

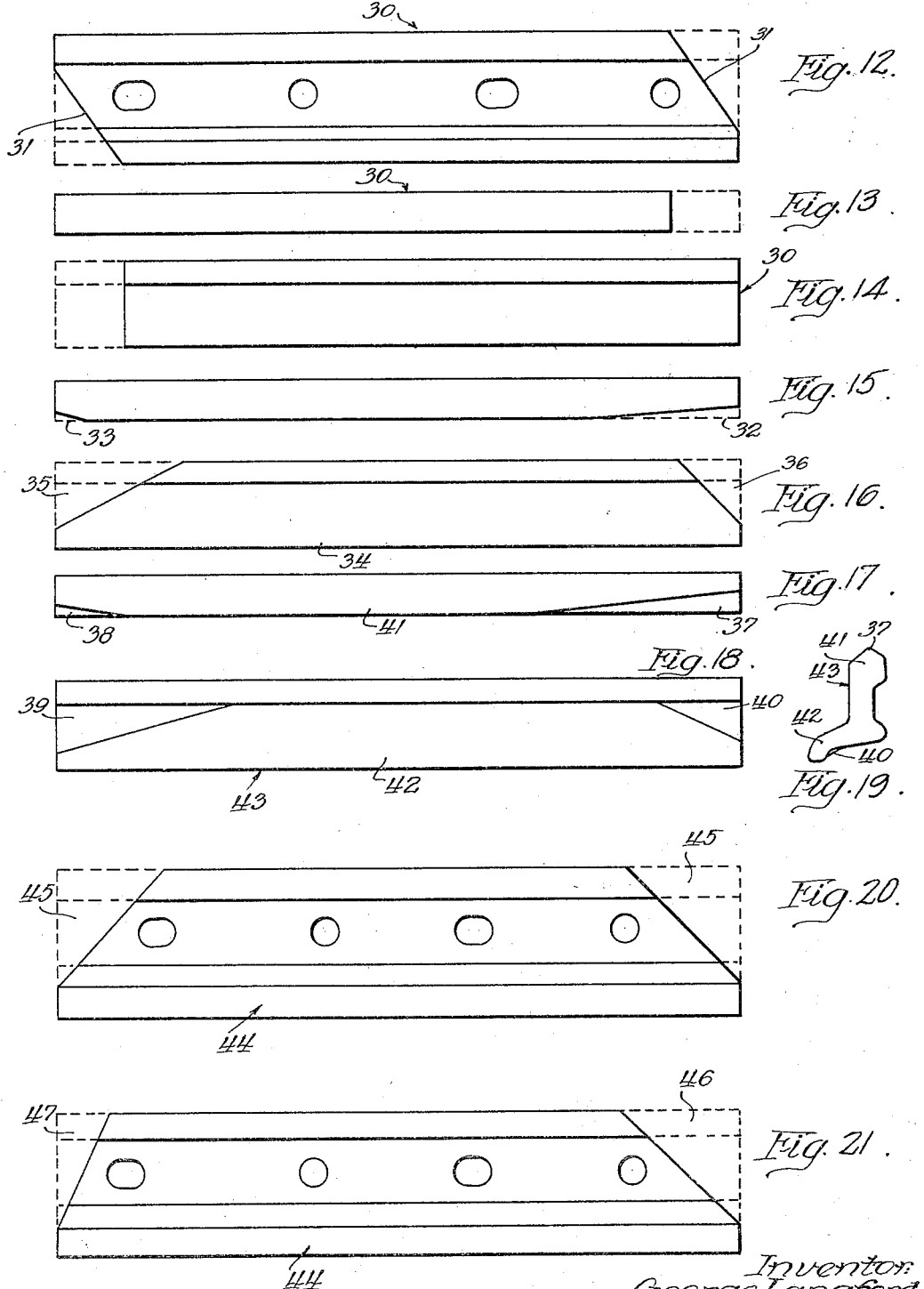

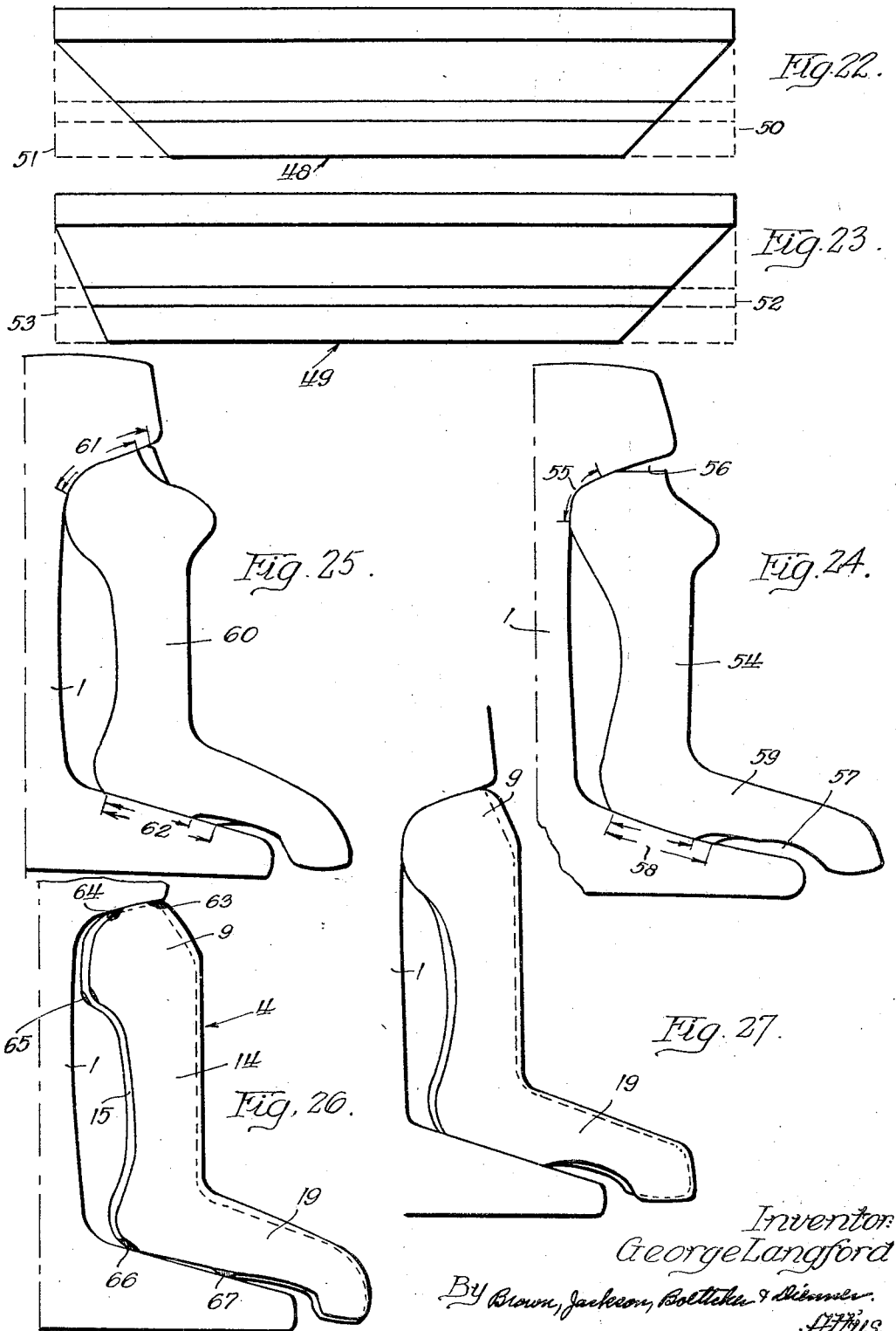

Oct. 4, 1932.  G. LANGFORD  1,880,349
METHOD OF REPAIRING RAIL JOINT BARS IN TRACK
Filed Aug. 14, 1930  7 Sheets-Sheet 5
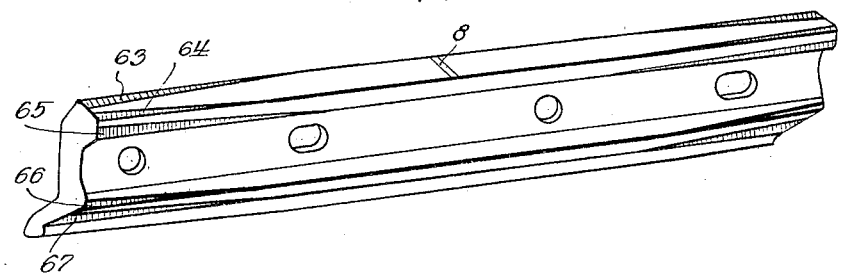
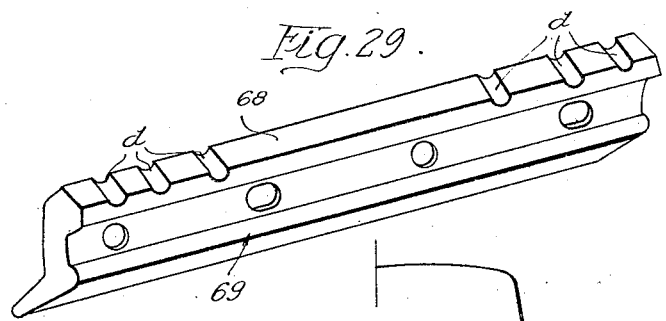
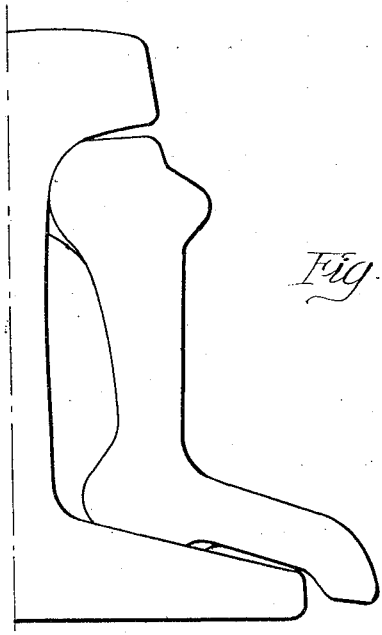
Inventor:
George Langford
By Brown, Jackson, Boettcher & Dienner
Attys.

Oct. 4, 1932.   G. LANGFORD   1,880,349
METHOD OF REPAIRING RAIL JOINT BARS IN TRACK
Filed Aug. 14, 1930   7 Sheets-Sheet 6
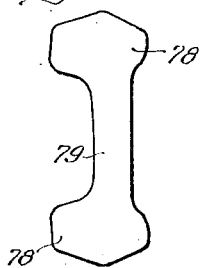
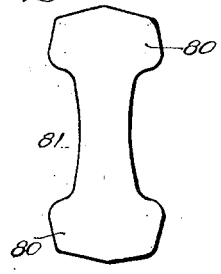
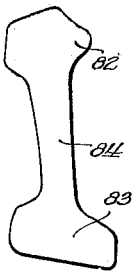
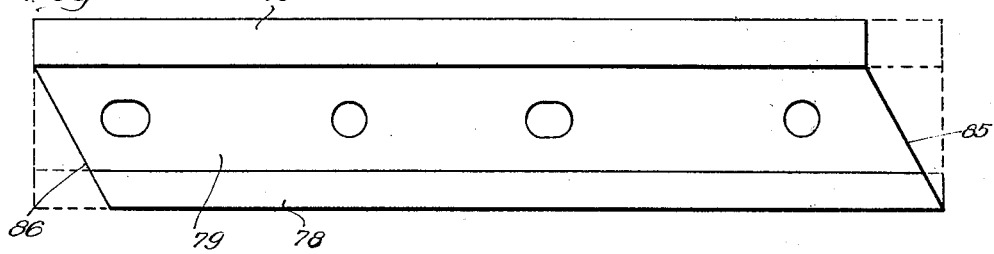
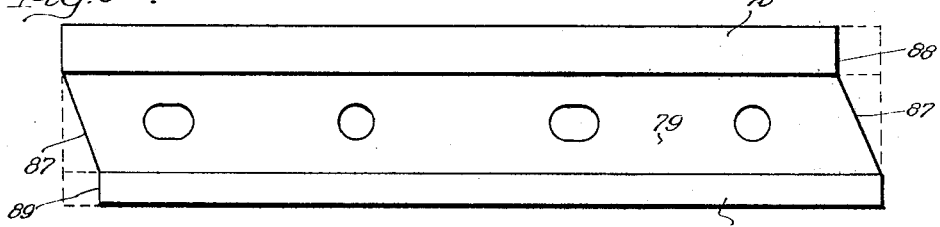
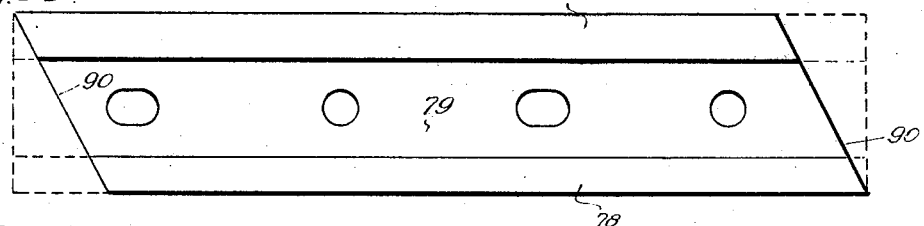
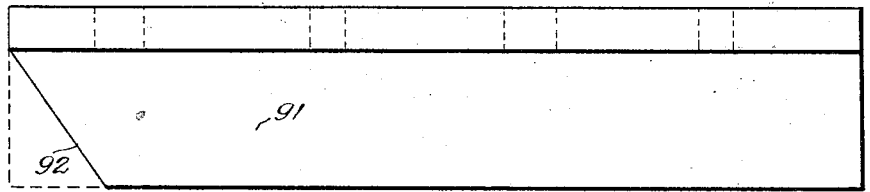
Inventor:
George Langford.
By Brown, Jackson, Boettcher & Dienner,
Attys.

Oct. 4, 1932.    G. LANGFORD    1,880,349
METHOD OF REPAIRING RAIL JOINT BARS IN TRACK
Filed Aug. 14, 1930    7 Sheets-Sheet 7
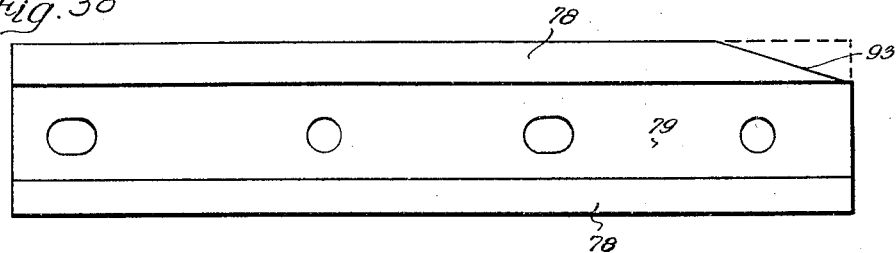
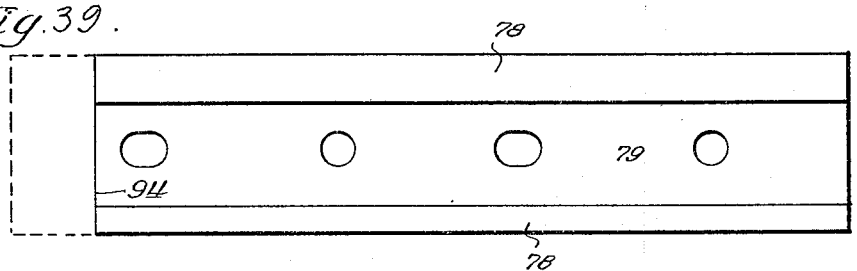
Inventor:
George Langford.
By Brown, Jackson, Boettcher & Dienner
Attys.

Patented Oct. 4, 1932

1,880,349

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

METHOD OF REPAIRING RAIL JOINT BARS IN TRACK

Application filed August 14, 1930. Serial No. 475,173.

This invention has to do with the repairing of rail joints and has particular reference to the repairing of rail joint bars in the track. In accomplishing this I may repair the rail joint bars to their original type or, in the repairing processes, I may convert bars of one type into bars of another type.

In my Reissue Patent No. 17,743 growing out of my original Patent No. 1,670,515, for method of repairing rail joints in track, dated May 22, 1928, I disclose a method of repairing a rail joint in track which consists in taking off the worn bars and replacing them with bars of abnormal fishing height at the center at least, so as to take up the fishing wear of rail ends and bars, and then welding metal on the top of the head of the rail to restore the rail head surface, thereby completely renewing the joint in track.

In my patent, above identified, I also disclose the use of an incurved bar of abnormal fishing height as well as the ordinary crowned bar, to be substituted for the worn bars in addition to the welding of the top of the rail head. This patent may be considered as the prior art in the repairing of a rail joint in track. It may be noted, however, that the actual repairing in track is restricted to the welding of metal on the top of the rail head, it having been found necessary to replace the worn rail joint bars with new or reformed bars sufficiently high at center to offset the fishing wear of the rail ends. As far as I am aware it has never been attempted to make a complete repair of the joint in track by repairing the worn bars and putting the same bars back in the same joints without removing them to the mills for reforming or substituting other bars for the worn bars. The main object of my invention, therefore, is to make a complete renewal of the joint in track without substituting other bars for the worn bars and welding the rail head only as heretofore.

The novelty in my invention lies not only in the repairing of the rail joint bars, obviating the necessity of substituting bars repaired elsewhere, but in the repairing process I convert bars of one type into bars of another type, all this being done in place with means available to railway track maintenance engineers.

In the prior art it has been found necessary in renewing a joint to send the worn rail joint bars to a considerable distance so that they may be reformed, crowned, uncrowned or whatever the case may be, and only by chance were the original bars restored to the same joints from which they were removed. It is obvious, therefore, that the repairing of a worn rail joint in track has been confined solely to the welding of the rail head and that as far as the rail joint bars are concerned, new or reformed bars, not the same as the originals, were put into the joint as substitutes for the worn bars removed, which after reforming were used elsewhere.

There has been a growing tendency among railway engineers to repair track in place so as to avoid the complete removal of rails or rail joint bars for repairs. The welding of rail ends has been a marked advance in this direction and the substitution of reformed rail joint bars with raised central fishing heights has been another marked advance to avoid the recurrence of battered rail ends on account of loose joints, this making the welding of the rail head an effective means of repairing the rail ends without removing them from track. The present invention is directed to similar treatment of the rail joint bars so that they may be repaired in track and maintained upon the same rail ends to which they were originally applied.

One object of this invention is to save the time and labor of hauling worn rail joint bars to the reforming plants which are usually located at a considerable distance from the track from which the worn bars are removed. Another object, most valuable to railway engineers, is to provide a cheap and convenient method of rail joint maintenance.

In the past railway engineers have been reluctant to remove worn rail joint bars from track, this reluctance resulting in allowing the joints to become too much worn, resulting in a loose joint and considerable damage to the rail ends because of batter. When the commercial reforming of worn rail joint bars became so successful that it is now common practice, it became apparent to railway engineers that inasmuch as the cost of reforming was so great a saving over the purchase of new rail joint bars, that worn bars might be removed from track sooner than formerly, and before serious damage was done to the rail ends. Prior to reforming practice, it was the custom to keep worn rail joints in the track too long and not remove them until the joint had become so loose that much damage to the rail ends resulted, necessitating removing the rails from track and sawing off the battered ends.

It can readily be understood that a cheap and effective method of repairing rail joint bars in track would encourage railway engineers to better rail joint maintenance in that they could at various times throughout the life of the joint make quick repairs to the bar so that the joint would be efficiently maintained throughout its life, this being done comparatively frequently so that the joint would always be maintained efficiently, thereby avoiding the greatly lowered efficiency resulting from the period prior to the final removal of the bars for reforming.

Railway engineers are now making great use of effective means for railway track maintenance. The most important of these are the cutting torch, welding torch and grinding wheel, these being carried about on small cars, thereby providing very effective and mobile means for making various track repairs without much disturbance of the track itself. In my invention I propose to use these means and others which may be found serviceable, so that the railway maintenance engineers may still further avoid the disturbing of track by repairing the worn rail joint bars without the necessity of their removal and substitution by new or reformed rail joint bars.

It may be understood from the preceding description that my invention is concerned with the worn rail joint bars before they are worn out, for when they are worn out they are ready for reforming in the ordinary manner. The aim of my invention is to maintain the joint efficiently until such time as it is worn out, which will eventually occur when so much of the central fishing height is worn away that it cannot be further repaired without passing through the bar reforming process.

It is now being recognized by railway engineers that rail joint bars which, prior to the present reforming practice, might remain in track say ten years, in which time the rail ends becomes greatly damaged by batter, should remain in track say only five years and then be reformed, thereby greatly lessening damage to the rail ends which would begin and increase after the first five years of use. My invention enables the joint to be maintained more efficiently for say the fourth and fifth year and a considerable portion of the next five years, thereby enabling the railway engineer to maintain the joints efficiently for possibly the complete ten years, instead of maintaining the efficiency of the joints for approximately the first three years only and, at the end of five years, having to remove and reform the bars, as at present.

It is well known to railway engineers that the effectiveness and the amount of wear in a rail joint is quite measurable; first by the simple process of watching the joint under moving loads to see whether or not the joint is tight at center, the tightness at center and not at the ends being the main determination, it being well known that when joints are loose at their central portion they are usually tight at their end portions. The progress of wear can be determined by caliper measurements over the joint as a whole, the measurement showing the progress of wear by the calipered widths of the joints. Thin gauges may be inserted between the bar and rail fishings to determine the amount of looseness of the joint. These and other means show clearly whether or not the joint is maintained efficiently. My invention proposes a complete repair of a joint, the bars being repaired in conjunction with the rail head surface welding, or independently, although the welding, cutting and grinding means used in rail head welding would also be used in rail joint bar repairing, making possible the complete renewal of a rail joint in track, where now only the rail head surface is repaired.

Now that the great bulk of old time, low carbon, unhardened bars are worn out, the necessity for hardening by oil quenching becomes a minor factor in the repairing of rail joint bars in track. Inasmuch as the bars now in track to be repaired by my present invention have already been hardened they may be repaired in track without the necessity of removing them to the reforming mills for hardening as well as reforming.

The wear of a joint in a two-way track, that is, a track upon which traffic travels in both directions, is quite different from that of a joint in a one-way track, upon which traffic travels in but one direction. The wheel constitutes a traveling load moving along the track. When this load reaches the center of the joint, the entire joint is bowed downwardly, the maximum bowing effect being at the center. This results, in effect, in moving the ends of the heads of the bars away from the rail heads and moving the rail flanges away from the bar flanges at the center of the joint. In consequence of this bowing effect, the heads of the bars are subjected to severe rubbing action at the center portion of the joint. When the front wheel of a truck passes off of the joint, and the wheels of the truck are at the ends of the joint, the ends of the joint are depressed and the center portion is bowed upwardly. The flange fishing surfaces of the bars are then subjected to severe rubbing action at the center portions thereof, the action being the reverse of that which occurs when a wheel is at the center of the joint. The bars are thus subjected to a continuous rubbing action which wears away the center portions of the fishing surfaces much more rapidly than the end portions thereof. This wear is more pronounced, in the head fishing surface, at the side of the center toward the approaching load, and is the reverse in the flange fishing surface. As a result in a one way track, the bar wears more rapidly at one side of the center of the head fishing surface than at the other side, and the flange fishing surface wears more rapidly at one side of the center than at the other, but the area of more rapid wear of the flange is at the opposite side of the center of the bar to the area of more rapid wear of the head. In a two-way track, due to the alternate direction of travel of the traffic, the wear is substantially equal at the opposite sides of the center of the bar, in both the head and the flange. This wear is concentrated at the center portion of the bar, and is characteristic of rail joints.

In the drawings:

Figure 1 is a side view of a worn rail joint illustrating the characteristic center wear of the bar and rail ends the bar being shown as a flat strap for clearness of illustration;

Figure 2 is an end view of a worn angle bar;

Figure 3 is an end view of a modified angle bar;

Figure 4 is a plan view of the bar of Figure 2;

Figure 5 is a plan view of the bar of Figure 3;

Figure 6 is an outer side view of a bar in the form of a flat strap;

Figure 7 is a plan view of the head of the bar of Figure 6 after considerable wear thereof has occurred, illustrating the manner of altering the fishing surface by removal of the end portions of the bar, in accordance with my invention;

Figure 8 is a plan view of the fishing surface produced by the method of Figure 7;

Figure 9 is an underneath flange view of a worn angle bar illustrating the method of altering the fishing surfaces by removal of the end portions of the bar, in accordance with my invention;

Figure 10 is an end view of the bar of Figure 7;

Figure 11 is an underneath flange view of the bar produced by the method of Figure 9;

Figure 12 is an outer side view of a worn one-way track bar altered in accordance with my invention;

Figure 13 is a plan view of the head of the bar of Figure 12;

Figure 14 is an underneath view of the flange of the bar of Figure 12;

Figure 15 is a plan view of the head of a bar converted into a one-way track bar from a two-way track bar, by removal of the outer and end portions of the fishing surface, in accordance with my invention;

Figure 16 is an underneath flange view of a bar converted into a one-way track bar from a two-way track bar by removal of the end portions of the bar, in accordance with my invention;

Figure 17 is a plan view of a bar converted into a one-way track bar from a two-way track bar by indenting or grinding down selected areas of the end portions of the fishing surface, in accordance with my invention;

Figure 18 is an underneath flange view of the bar of Figure 17;

Figure 19 is an end view of the bar of Figures 17 and 18;

Figure 20 is an outer side view of an angle bar for use in two-way track produced from a bar of ordinary type by removing the end portions of the bar along oppositely inclined diagonal lines;

Figure 21 is an outer side view of an angle bar produced in the same manner as the bar of Figure 20, but adapted for use in one-way track;

Figure 22 is an outer side view of a bar similar to that of Figure 20 but with the ends cut reversely thereto;

Figure 23 is an outer side view of a bar similar to that of Figure 21 but with the ends cut reversely thereto;

Figure 24 is an end view of a head free bar as applied to a rail;

Figure 25 is an end view of a full head contact bar as applied to a rail;

Figure 26 is an end view of a worn ordinary head contact angle bar as applied to a rail;

Figure 27 is an end view of a bar produced from the bar of Figure 26, in accordance with my invention, applied to a rail;

Figure 28 is a perspective inner side view of the bar of Figure 27;

Figure 29 is an end view of a head free bar produced from a worn ordinary head contact bar, in accordance with my invention;

Figure 30 is a perspective inner side view of a bar produced from a worn bar by removing selected areas of the end portions of the fishing surface to produce spaced depressions or notches therein, in accordance with my invention;

Figure 31 is an end view of an I-beam bar to which my invention is applicable, this bar being vertically symmetrical;

Figure 32 is an end view of an I-beam bar to which my invention is applicable, this bar being symmetrical both vertically and horizontally;

Figure 33 is an end view of an unsymmetrical bar of the I-beam type to which my invention is applicable;

Figure 34 is an outer side view of a one-way track bar produced in accordance with my invention from the bar of Figure 31;

Figure 35 is a view similar to Figure 34 but showing a modification thereof;

Figure 36 is an outer side view of a one-way bar produced from the bar of Figure 31 by removing metal from each end along an oblique line extending the full height of the bar;

Figure 37 is a plan view of a one-way bar produced from an angle bar by removing a portion of the flange at one end thereof;

Figure 38 is an outer side view of a one-way bar produced from a bar of ordinary type by removing a portion of the head at one end thereof;

Figure 39 is an outer side view of a one-way bar produced from a bar of ordinary type by removing a portion of the bar at one end and for the full height thereof.

Figure 1 is a side view of a rail joint, the rail ends 1 and 2 being joined together by a bar 3, which may be of angle, I-beam or any other type but which, for convenience in showing the central wear, is indicated in the figure as a flat strap with top and bottom fishing surfaces. It will be noticed that the wear of the bar and rail ends covers a very restricted central portion, this being so well known to the prior art that no further description is necessary.

Figure 2 shows an ordinary angle bar 4, and Figure 3, an angle bar 5 converted to some extent to the I-beam type. Figure 2 may be taken as showing the condition of a worn angle bar removed from track. Due to its lateral flexibility this bar has become curved in at center, this resulting from the pull of the center bolts to take up the wear at the central portion of the bar, the joint being worn out when the bar, at the center thereof, touches the web of the rail.

In Figure 4 the area 6 of greatest wear of the head fishing surface is unshaded and the end areas 7 of much more limited wear are indicated by shading. Usually there is a lip 8 at the center of the head 9. The contour of the original bar is shown in dotted lines and of the worn bar in full lines. In the case of the bar of Figure 2, the fishing height has been maintained at the central portion by incurvature of that portion, the ends being held by lack of wear from moving inward. In the case of the I-beam type of bar represented by Figure 3, the wear at center is shown in dotted lines and the lack of wear at the ends in full lines. The bar of Figure 3 is hardened by oil quenching and because of that it has greater lateral strength than the angle bar of Figure 2. It resists bending in at the center to take up the central fishing wear so that this type of bar when removed from track will be approximately straight and with the central wear more restricted than in the angle bar of Figure 2, although when bolted in the worn joint, the bar, no matter how rigid laterally, will as a rule, be bent in to some extent at center by the tension of the center bolts.

Figure 5 is a view of the bar of Figure 3 looking at it from above. This bar is substantially straight, or at least straighter than the bar of Figure 4. As my invention is concerned with the repairing of bars before they become worn out Figures 2 to 5 inclusive may be taken as the tendency for these bars to become as shown in the figures, their condition intermediate between the time when new or worn out being less exaggerated than the figures which are made exaggerated for purposes of illustration. Assuming that the central fishing height is sufficient to permit draw space at center between the bar and rail ends, these bars may be repaired in track by grinding down the shaded areas 7, including the central lip 8, very slight grinding being required as the wear at center tapers gradually to the ends. Obviously the grinding off of the extreme ends is more important than the portions between the ends and center. The end drag or reluctance of the end portions of the fishing surfaces to wear equally to the central portions of such surfaces has been described in my patent for rail joint, Number 1,562,423, dated November 17, 1925, reissued January 14, 1930, reissue Patent Number 17,561, and in my patents Nos. 1,799,381, 1,799,380 and 1,799,382, for even wear bar, tight center bar and rail joint and bar therefor, respectively, filed March 28, 1929, March 25, 1929, and May 2, 1929, respectively, all of which recognize the objectionable end drag or reluctance of the end portions of the fishings to wear, thereby opposing a tight fishing fit at center because of the difficulty of bending the center portion of the bar inward to the rails by center bolt tension, this difficulty and the strain placed in the bar to overcome it, increasing with the lateral rigidity of the bar. In the case of the bars of Figures 2 to 5 inclusive, I repair the partly worn rail joint bars by unbolting them from the joint and grinding away portions or all of the thin surface metal indicated by 7 and also the lip 8. The grinding of the lip 8 prepares a bright surface for disclosure of any incipient cracks that might be in the bar, which treatment forms the substance of my copending application Serial No. 532,145, for method of repairing and reforming bars, filed April 23, 1931. As all of this process of repair may be conveniently carried out by the grinding apparatus used in smoothing off the rail ends after welding, the rail joint bars can effectively be renewed by removing the fishing drag of the ends and grinding down the central lip to search for incipient cracks. If the bar shows a crack it may be ground deeper at that point for a very restricted length, thereby removing the crack and any further tendency for the crack to extend. If too deep so that further grinding will too much weaken the bar or not remove the crack, this method of repair will have proved most effective by disclosing a bar that will eventually break and which should therefore be permanently removed.

By this simple method of grinding off the shaded areas 7 and the lip 8 in Figures 4 and 5, the bars are made as serviceable as when new with the exception of the slight sacrifice of draw space between bar and rail web representing the amount of fishing height in the bar and rail lost by wear. After a certain amount of service the bars can be again unbolted and ground and bolted up again. The bar of Figure 2 after repair may retain the curvature caused by wear shown in Figure 4, and the bar of Figure 3 may be substantially straight as in Figure 5, although bar 4 may be pulled in straight again at the ends by the end bolts if sufficient metal is ground off at 7, and it may be further pulled in at the ends if still more metal is ground off at 7, this being true of the bar of Figures 3 and 5. It will be noted that Figures 4 and 5 are views from above showing wear of the head fishing surface only. It is not considered necessary to show underneath views of the flange fishing as to their condition of wear and the metal to be ground off, but in principle the flange fishing is the same as the head fishing and would be treated in the same manner, although it may be that the grinding might be done on the flange end fishings or on the head end fishings only, the repairing in this manner of only one fishing surface enabling the bar to be made slightly higher or lower than in its worn condition when viewed from the side.

The bar of Figure 3 stands midway between the angle bar of Figure 2 and the I-beam bar, the latter being heavily reinforced on its outside top and bottom surfaces giving great lateral strength which with oil hardening makes a bar too stout laterally to be bent in at center.

Taking Figure 5 as a view from above of an I-beam bar, the grinding off of the areas 7 will bring it back to its original condition and if still more metal is ground off from areas 7, the center will be tight as to fishing fit and the ends slightly loose, this condition soon being evened up by possibly slight bending in of the ends or of central wear which soon brings the ends in tight fishing contact.

Figure 6 is a side view of an ordinary bar 4 of standard 24" length or longer. Figure 7 is a top view of the head fishing of bar 4 showing the usual condition of wear. Inasmuch as the fishing drag becomes greater as we proceed from the intermediate portion to each end of the bar a considerable amount of the end fishing drag may be removed by simply cutting the ends of the bar off along the lines 26—26, converting the 24" bar into a bar shortened to a less than standard length bar, such as I have disclosed in my resissue Patent No. 17,963 reissued February 10, 1931 from Patent No. 1,757,774, for rail joint and bar, dated May 6, 1930. This bar, shorter than 24" and for use on heavy railway T-rails is shown in plan view in Figure 8. If in Figure 7 the ends are cut off at 26—26, the remaining end fishing surfaces 7 surface ground, and the lip 8 ground off, the result will be the head fishing surface viewed from above shown in Figure 8.

Figure 10 is an end view of a bar 27 in which it is desirable to correct as much as possible the tendency to end fishing drag of the flange surface. Figure 9 is an underneath view of the flange fishing of bar 27, in which it is desired to remove a considerable portion of the flange 28 along the lines 29—29, this being accomplished by burning off the flange along these lines and surface grinding, if desired, at 7, the result being as in Figure 11, which is an underneath view of the bar flange after being repaired in track, surface grinding and cutting with a torch. My Patent No. 1,842,412 issued January 26, 1932 discloses various forms of bars for use in one-way track, where the traffic is all in one direction. These bars are so constructed that when bolted to the rail ends, one or both of the top and bottom fishing contacts are of less area in one longitudinal half of the joint than in the other half.

Figure 13 shows diagrammatically the head fishing, top view, and Figure 14, the flange fishing, underneath view, of the bar of Figure 12, the one fishing area removal in each case being indicated in dotted lines. A one way track bar may also be produced from a bar of ordinary type, by grinding or burning off the corners of the bar head as indicated in Figure 15, which is a top view of a bar head. One half of the bar can be given much less fishing surface at the ends by burning or grinding off more metal at 32 than at 33. Figure 16 is an underneath view of a bar flange 34 wherein, as in Figure 11, the bar flange can be burnt off diagonally at each end, more being burnt off from one end, as indicated at 35, than from the other end, as indicated at 36, in order to produce a one-way track bar or a bar in which the fishing area of one-half is considerably less than the fishing area of the other half.

Another way of producing a one-way track bar is by grinding down selected areas of the fishing surfaces as indicated at 37 and 38, and 39 and 40, of the head 41 and flange 42, respectively, of an angle bar 43, in Figures 17 and 18. This is much the same as in Figures 15 and 16 except that it is accomplished by surface grinding or indenting, whereas the bar of Figures 15 and 16 is made by burning off metal with a torch.

A form of bar which I claim as new, and which can be produced in track with a cutting torch, is shown in Figure 20, this being a side view of an angle bar 44 wherein the length of the head fishing may be made shorter than the length of the flange fishing by diagonal cutting, the metal removed being indicated at 45 by dotted lines. A variation of this bar for use in one way track is shown in Figure 21, in which the amount of metal removed from one end is greater than that removed from the other end, as indicated at 46 and 47. Also, this trapezoidal form may be cut off at the ends along lines inclined downwardly and inwardly of the bar, so as to leave the head fishing longer than the flange fishing. Such a bar 48, for use in two-way track, is shown in Figure 22, and a bar 49 of similar type for use in one-way track is shown in Figure 23. The amount of metal removed is indicated in dotted lines, at 50 and 51 in Figure 22, and at 52 and 53 in Figure 23.

Various methods I have described used singly or in combination come within the scope of my invention and their use to convert a bar of one type into a bar of another type I also claim as new and applicable to all types of bars.

In this connection there are types of bars in common use different from those previously described. One of these is shown at 54 in Figure 24, fitted to a rail 1, the head fishing being confined to the head fillet 55 and the ordinary head contact surface being clear of the rail head fishing at 56, the flange having easement at 57 to provide a restricted width of flange fishing 58 so that the head of the bar, pivoting at 55 remains fixed and the flange 59 moves into the rail as wear occurs and takes up wear of fishing height as the flange slides up the inclined surface of the rail. This is known as the head free bar. The flange fishing surface of this bar contains a feature of my invention whereby the ordinary fishing width 58 is confined to the center portion of the bar, the end portions of the bar having reduced fishing width to accelerate wear at the end portions.

In Figure 25 is shown a bar 60 of my invention, Patent No. 1,759,458, designed primarily to be reformed from a worn head contact bar. In this bar I not only preserve the original amount of head contact with the rail but add to it by further contact with the head-web fillet of the rail giving the fishing length 61, the restricted flange fishing width 62 being similar to that of the head of bar shown in Figure 24. Figure 25 is further featured by reduction of fishing width of the top and bottom fishing surfaces at the end portions of the bar, the top being of greatest fishing width 61, and the bottom of greatest fishing width 62 at the center portion of the bar. The end portions of the fishing surfaces of Figures 24 and 25 may be narrowed as shown by grinding off metal from the outer corners of the fishing surfaces.

I find it possible, however, by the use of grinding or other convenient means to convert bars of the ordinary head contact type, wholly or in part, to forms similar to those shown in Figures 24 and 25. This represents a third stage in my invention, whereby bars almost completely worn out may be given a new life by converting head contact bars into ones similar to Figures 24 and 25 which do not require the fishing height of ordinary head contact bars.

Figure 26 is an end view of a rail 1 and an ordinary worn angle bar 4, the end portion being shown at 14 and the center 15. This bar, nearing the end of its life, may be prepared to function as a head free bar by grinding off metal of the end portions at 63—64—65—66 and 67 so as to become eventually bars of the head free type of Figure 24 or of the full head contact type of Figure 25, retaining their incurvature caused by wear and having reduced end fishings on the head 9 of Figure 27 and the flange 19.

The various steps of corner grinding of the bar 4 of Figure 26 are indicated by the darkened areas in the perspective inner side view of this bar, Figure 28, which is a view of a worn incurved head contact bar from which may be produced various bars whose head fishing contact includes the head-web fillet of the rail at the central portion of the bar at least, the end portions being variously modified as in Figure 24—25—27 and 29. In these various figures, the central portion of the bar has been converted by repairing in track to either a head free or full head contact bar. It is not my purpose here to figure and describe the numerous possible conversions of one type of worn bar into another type of renewed bar, all capable of accomplishment in track without removal except for unbolting, repairing and then bolting up again, it being sufficient to note that many variations are possible. Figure 30 is another of many cases. In this form, the effective contact area of the end portions of the fishing surface of head 68 of bar 69 is reduced by notches or depressions $d$ ground or burned in the head, the distance between adjacent depressions decreasing toward the ends of the bar.

The broad aspects of my invention which, may or may not be used in conjunction with welding of the rail, consist, first, in restoring the worn bars to approximately their original condition, second, in converting bars of one or more types into bars of other types, and third in converting bars of known types into certain forms of bars which I claim as new, all of these steps coming within the scope of repair in track with proper machinery and without the necessity of removing the bars to mills or shops established for bar reforming.

My invention is applicable to bars of the I-beam type, as well as to angle bars. In Figure 31 I have illustrated an I-beam bar of known type, which comprises heads 78 and a connecting web 79. This bar is symmetrical vertically and is vertically reversible, that is, either head may be presented to the rail head.

The bar of Figure 32 comprises the heads 80 and connecting web 81. This bar is symmetrical both vertically and horizontally, each head having two fishing surfaces, and may be reversed either vertically or laterally.

The bar of Figure 33 is unsymmetrical, and comprises a head 82, a foot or flange 83 and a connecting web 84. This bar is not reversible.

Figure 34 illustrates a one-way bar produced from the bar of Figure 31 by removing metal from each end of the bar along the lines 85 and 86. The upper portion of line 85, corresponding to the height of the upper head, is perpendicular to the upper head and the major portion of this line is inclined downward and toward the adjacent end of the bar, extending the full width of the web and the full height of the lower head. The major portion of line 86 is similar and parallel to the major portion of line 85, but the upper portion of line 86 is defined by the adjacent end of the upper head. In the bar thus produced, the area of fishing contact of each head is greater at one side of the longitudinal center of the bar than at the other side thereof, and the heads are oppositely related. Since this bar is produced from the symmetrical bar of Figure 31, it is reversible and there is no necessity, therefore, of forming these bars in rights and lefts. The bar of Figure 34 may also be considered as produced from the bar of Figure 32. It is also possible to produce the bar of Figure 34 from an angle bar, or from the bar of Figure 33, but it would then be necessary to form the bars for rights and lefts, since angle bars and the bar of Figure 33 are not reversible. In Figure 34 the end portions of the bar which have been removed are indicated by dotted lines.

The bar of Figure 35 is a one-way track bar produced from the bar of Figure 31. To produce this bar a portion of the web and a portion of one head is removed, at each end of the bar. The web is cut away or removed along the inclined line 87, the upper head is removed along a perpendicular line 88 and the lower head is removed along a perpendicular line 89. The portions removed from the ends of the bar are indicated by dotted lines. The bar of Figure 35 may also be produced from the bar of Figure 32, from the bar of Figure 33, or from an ordinary angle bar. When this bar is produced from a reversible bar it need not be formed in rights and lefts, as above stated.

In Figure 36 I have shown a one-way bar produced from the bar of Figure 31 by removing metal from the ends thereof along inclined lines 90 extending the full height of the bar. This bar may also be produced from the bar of Figure 32, from the bar of Figure 33, or from an ordinary angle bar.

Figure 37 illustrates a one-way bar produced from an angle bar of ordinary type by removing a portion of flange 91 thereof, at one end, along a line 92 inclined inwardly and toward the adjacent end of the bar. This reduces the area of the flange fishing surface at one side of the longitudinal center of the bar relative to the other side thereof. This cutting or removal of a portion of the flange does not affect the area of the head fishing surface. The bar of Figure 37 may also be produced from the bar of Figure 33.

The bar of Figure 38 is a one-way bar produced from the bar of Figure 31 by removing a portion of one head 78, at one end thereof, along the inclined line 93. This bar may also be produced from the bar of Figure 32, from the bar of Figure 33, or from an ordinary angle bar.

The bars of Figures 20 to 23, inclusive are produced from an angle bar. I also produce bars of the same general type from the bars of Figures 31 and 32 by removing the end portions thereof along oblique lines, as in Figures 20 to 23. The bars thus produced from the bars of Figures 31 and 32 may be either one-way or two-way bars and, since they are reversible, need not be formed in rights and lefts.

In Figure 39 I have shown a one-way bar produced from the bar of Figure 31, by cutting off or removing a portion of the bar at one end only and along a line 94 perpendicular to the bar. The portion of the bar removed is indicated by dotted lines. This bar may also be produced from the bar of Figure 32, from the bar of Figure 33, or from an ordinary angle bar.

The preceding description and figures all relate to the repairing of rail joints in track, maintaining the original independence of each rail length which permits slight longitudinal movement of the rail ends on the bars. This slight movement results from the expansion and contraction of the rails in extremes of temperature. The bolt holes in the rail ends and bars are made larger than the bolt diameters so as to permit this longitudinal movement. A steel rail fully exposed to the sun is a great absorber of heat, and in summer, the rail becomes much hotter than the air temperature. As track laying is usually done in warm seasons, it has been the custom to place adjacent rail ends close together so as to leave the least possible gap between them when the rails contract in cold weather, and yet not so close that in hot weather expansion of the rails will result in too tight contact of the ends. In the latter case, the track would become distorted and snaky, this being true more of light than of heavy rails.

The great increase in weight of rolling stock, loads, speeds and frequency of train movements in the last ten years or so have led to increased weight and strength of rails and joints. Where a rail weighing 100 pounds per yard was considered heavy, rails weighing 118 to 130 pounds are used extensively, and rails 150 to 175 pounds are being considered. Stronger bars and bolts were used, these being further strengthened by heat treatment.

In spite of all this, the track has not kept pace with the heavy duty imposed upon it, and the weakest places in track are at the joints. This latter has become recognized by railway engineers as the most serious problem in railway track maintenance, so much so that the need for radical departure from present practice is generally recognized particularly in track where heavy trains run over it with great frequency at high speeds. For the sake of clearness in the following specifications I will distinguish such track as heavy duty track, the rails weighing 90 pounds and over. Track with rails weighing under 90 pounds is as a rule subjected to moderate duty by reduction of speeds of heavy trains and train frequency, so that there are many instances where secondary track with rails of moderate weight stand up fairly well as compared with main track using heavy rails.

However, the weight of the rails used in secondary as well as in main track is increasing, and the joint is ever a source of worry and expense. The bars not being integral with the rail ends permit movement between bars and rail ends, so that in spite of the present practice of frequent screwing up of the bolt nuts, the bars will yield slightly under load, so that the joint cannot be kept to the same efficiency as the rail. The present principle of joint construction is defective, in that a pair of rails cannot be made an integral part of the joint.

What I claim is:

The method of repairing a worn rail joint in track, consisting in cutting off substantial amounts of metal, including part of a fishing surface, from the end portions only and lengthwise of at least one of the top and bottom members of the bars and thereby substantially reducing in width fishing contact between the bars and the rail ends at the end portions at least of the joint.

In witness whereof, I hereunto subscribe my name this 11th day of August, 1930.

GEORGE LANGFORD.